April 20, 1954

J. N. VOS ET AL

DEVICE FOR DERIVING PHASE-SHIFTED VOLTAGES FROM AN INPUT VOLTAGE OF VARYING FREQUENCY

Filed Nov. 16, 1948

2,676,308

INVENTORS.
JACOBUS NICOLAAS VOS
BERNARDUS DOMINICUS HUBERTUS TELLEGEN
BY
Fred M Vogel
AGENT.

Patented Apr. 20, 1954

2,676,308

UNITED STATES PATENT OFFICE 2,676,308

DEVICE FOR DERIVING PHASE-SHIFTED VOLTAGES FROM AN INPUT VOLTAGE OF VARYING FREQUENCY

Jacobus Nicolaas Vos and Bernardus Dominicus Hubertus Tellegen, Eindhoven, Netherlands, assignors to Hartford National Bank and Trust Company, Hartford, Conn., as trustee Application November 16, 1948, Serial No. 60,256

Claims priority, application Netherlands December 5, 1947

2 Claims. (Cl. 333—29)

This invention relates to a device for deriving two voltages exhibiting a substantially frequency-independent phase-shift and amplitude ratio from an alternating voltage (hereinafter referred to as the control-voltage) having a frequency varying within a determined range of frequencies, the phase-shifted voltages being derived from two networks bringing about a phase-shift which is in linear relationship to the logarithm of the frequency within the range of frequencies concerned.

The invention is applicable with advantage more particularly in a single side-band transmitter in which two 90° phase-shifted modulating signals are required to be taken from sound signals covering a broad range of frequencies (for example from 150 to 3000 c./sec.).

In known devices of this kind use is made of two networks which have to be fed with equal voltages and practical difficulties arise, for example, in connection with the required frequency-independent amplitude ratio between the phase-shifted voltages and the ratio between the above-mentioned control voltage and the input voltage of the networks.

The invention permits of avoiding these practical difficulties.

According to the invention, to this end the networks used in devices of the said kind exhibit a constant transmission impedance at least within the frequency range concerned. The term transmission impedance is here to be understood, as is usually the case, to mean the relationship between the output voltage and the input current.

Furthermore, according to the invention, it is advantageous to connect the two phase-shifting networks in series. This ensures on the one hand, equal input currents and hence a frequency-independent relationship between the output voltages taken from the networks and, on the other hand, the input impedance of the series-connection varies but slightly with frequency, which is beneficial to a frequency-independent relationship between the control voltage and the input current of the networks.

Including the networks connected in series in the output circuit of an amplifying tube of comparatively high internal resistance, for example a screen-grid tube, which is controlled by the control voltage, ensures a relationship between the control voltage and the voltages taken from the networks which is sufficiently independent of frequency within the frequency range concerned for most practical purposes.

In order that the invention may be more clearly understood and readily carried into effect, it will now be described more fully, by reference to the accompanying drawing.

Fig. 1 shows a network which may be used in accordance with the invention.

In Fig. 2 the phase-difference between the voltages derived from two of the networks shown in Fig. 1 are plotted as a function of the logarithm of the frequency.

Figure 1:
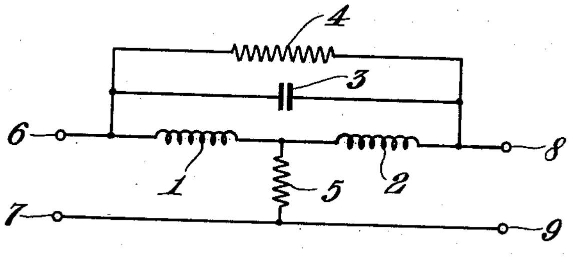

The network of Fig. 1, which may be used in accordance with the invention, is constituted by a so-called shunted T-filter, of which the series-impedances are constituted by the coil halves 1, 2 of a centrally tapped coil, which are shunted by a condenser 3 and a resistance 4, connected in parallel, the traverse impedance being constituted by a resistance 5.

A current supplied to the input terminals of the network shown produces a phase-shifted output voltage at the output terminals 8 and 9. This phase-shift $\theta$ may be represented by $$\theta = A + C \log x \qquad (1)$$

in which A and C are constants for the network under consideration and $x$ represents the ratio between the frequency $w$ of the signal which is to be shifted in phase and $w_0$ represents the natural frequency of the oscillatory circuit constituted by the inductance 1, 2 and the condenser 3, thus $$x = \frac{w}{w_0}$$

The use of two suitably proportioned networks of the said kind permits of deriving from the networks two voltages of which the phase difference is substantially independent of frequency within a broad range of frequencies ratio between the limiting frequencies greater than 5, for example 20. If, for example, the constants A and C respectively of the two networks are equal and the resonance frequency of one network is the m-fold of that of the other network, it follows from Formula 1 that the phase-difference $$\theta_1 - \theta_2 = C \log m \qquad (2)$$

and hence is constant.

It is evident that any arbitrary phase-difference may be obtained according to the ratio between the resonance frequencies of the two networks.

Figure 2:
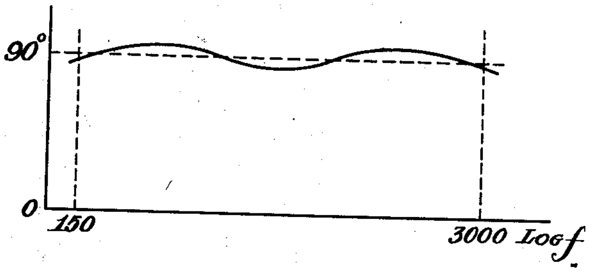

In Fig. 2 the phase-difference between the voltages derived from two such networks is plotted as a function of the logarithm of the frequency. The figure shows that the phase-difference exhibits a maximum for two frequencies and exhibits a minimum for an intermediate central frequency. The divergences from the phase-difference desired may be greatly reduced for the given frequencies by suitable proportioning and may be equal to one another, since it has been found that for suppression of the undesired side-band the choice of equal divergences is more important than the realisation of a phase-difference of exactly 90° for the central frequency. In the embodiment under consideration the divergences for the limiting frequencies (150 and 3000 c./sec.) equal the divergence for the central frequency.

In order to satisfy the above-mentioned requirements, if the values of the condenser 3, the coil halves 1, 2 and the resistances 4 and 5 are C. $L/2$, R and $R/8$ respectively, the quantities $$\frac{R}{1}, \frac{1}{C}$$

for the two networks are chosen to be equal to 4 and the resonance frequencies for the networks 322 and 1400 c./sec. respectively.

The phase divergences on either side of the desired 90° phase-difference line are with this proportioning about 2.5° for a range of frequencies from 150 to 5000 c./sec.

The divergences from the desired phase-difference may be further limited, if desired, by including correcting elements in the shunted T-filters.

Figure 3:
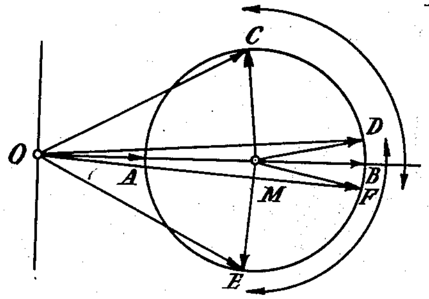
Fig. 3 shows impedance diagrams for the network shown in Fig. 1.

Fig. 3 shows impedance diagrams for the networks under consideration with the given proportioning.

The input impedance of these networks equals $$\frac{R}{8}$$

for a frequency 0 and ∞. The value and phase of the input impedance may be represented by a vector OA. The input impedance for the resonance frequency of the network is ⅝ R, corresponding to vector OB. With varying frequency the extremity of the input-impedance vector describes the circumference of a circle having a centre M and a radius ⅛ R, the transmission impedance in the diagram concerned corresponding in value and phase to the radius vector and hence being ⅛ R independently of frequency.

With the said suitable proportioning the extremity of the transmission-impedance vector moves from one network upon variation in frequency between 150 and 3000 c./sec. along the arc CDBF (about 100°) and the extremity of the transmission-impedance vector of the other network moves along the arc DBFE (also about 100°), the two vectors invariably being substantially at right angles to one another.

The input impedance of the series-connection of the two networks equals the vectorial sum of their individual input impedances. The ratio between the maximum and minimum input impedances is about 1.4 for each of the networks and only 1.07 for the series-connection.

Figure 4:
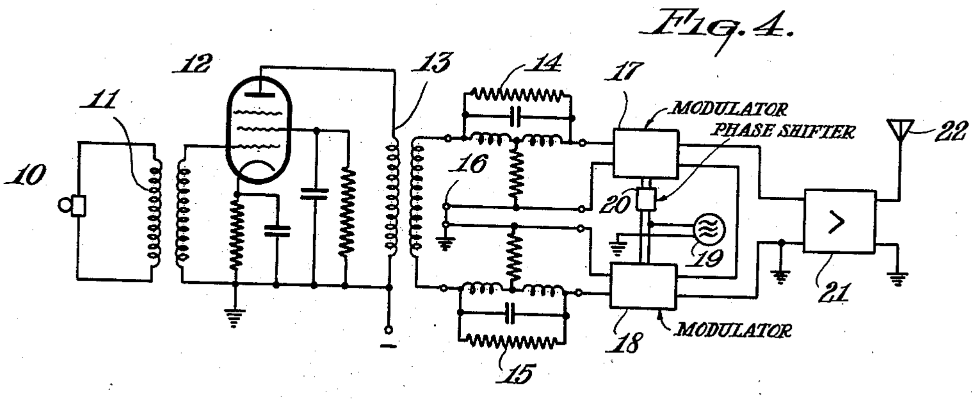
Fig. 4 shows a single side-band transmitter according to the invention.

Fig. 4 shows diagrammatically a single side-band transmitter according to the invention.

The low-frequency signals to be transmitted, which originate from a microphone 10, are supplied by way of a transformer 11 to the control grid of an amplifying tube 12 which is shown as a pentode. The anode circuit of the pentode 12 includes an output transformer of which the secondary winding is connected to two networks 14 and 15 of the type described, which are connected in series. The junction 16 of the networks is connected to earth.

In the circuit shown it is not possible to provide the secondary winding of the transformer 13 with an earthed central tap in view of the frequency-dependency of the ratio between the input impedances of the networks 14 and 15 and the earthing of the interconnected input terminals of the networks.

The voltages which are derived from the networks and which exhibit a phase shift of 90° which is substantially independent of frequency within the frequency range concerned are supplied as modulating voltages to two modulators 17 and 18, which have in addition supplied to them with a 90° phase-shift the high-frequency oscillations to be modulated which are supplied by an oscillator 19. The said 90° phase-shift may be obtained, for example, by the use of a phase-shifting network 20.

Superposition of the modulated oscillations derived from the output circuits of the modulators 17 and 18 has the effect of suppressing one of the side-bands, whereafter the oscillations are supplied, by way of an output amplifier 20, to an aerial 21.

What we claim is:

1. Apparatus for deriving from an input voltage whose frequency varies within a predetermined range first and second output voltages having a ratio of phase-shift and amplitude which is substantially independent of frequency, said apparatus comprising first and second networks having a transmission impedance which is substantially constant throughout said predetermined range, and means to apply the input voltage to said networks in series relation, said networks each producing a phase-shift bearing a linear relationship to the logarithm of the frequency within said predetermined range, the phase-shifts produced by said networks being displaced substantially 90 degrees, said networks being constituted by a four terminal shunted T-filter whose series impedance is formed by a condenser connected across an inductor in parallel resonance therewith and a damping resistance connected across said condenser, and whose transverse impedance is formed by a resistance connected to the midpoint of said inductor.

2. An arrangement, as set forth in claim 1, wherein the parallel resonance impedances in the first and second networks are tuned to different frequencies.

References Cited in the file of this patent

UNITED STATES PATENTS

| Number | Name | Date |
|---|---|---|
| 2,153,857 | Whaler | Apr. 11, 1939 |
| 2,248,239 | Jarvis | July 8, 1941 |
| 2,248,250 | Petersen | July 8, 1941 |
| 2,392,476 | Hodgson | Jan. 8, 1946 |
| 2,442,097 | Seeley | May 25, 1948 |
| 2,511,606 | Tompkins | June 13, 1950 |
| 2,529,117 | Tompkins | Nov. 7, 1950 |
| 2,566,876 | Dome | Sept. 4, 1951 |

FOREIGN PATENTS

| Number | Country | Date |
|---|---|---|
| 532,186 | Great Britain | Jan. 20, 1941 |